United States Patent
Imai et al.

(10) Patent No.: US 11,486,890 B2
(45) Date of Patent: Nov. 1, 2022

(54) AUTOMATED ANALYZER

(71) Applicant: HITACHI HIGH-TECH CORPORATION, Tokyo (JP)

(72) Inventors: Kenta Imai, Tokyo (JP); Shunsuke Sasaki, Tokyo (JP); Hiroya Umeki, Tokyo (JP); Tatsuki Takakura, Tokyo (JP); Takenori Okusa, Tokyo (JP); Hiroki Fujita, Tokyo (JP); Taku Sakazume, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 30 days.

(21) Appl. No.: 16/647,109

(22) PCT Filed: Nov. 15, 2018

(86) PCT No.: PCT/JP2018/042231
§ 371 (c)(1),
(2) Date: Mar. 13, 2020

(87) PCT Pub. No.: WO2019/163222
PCT Pub. Date: Aug. 29, 2019

(65) Prior Publication Data
US 2020/0278367 A1    Sep. 3, 2020

(30) Foreign Application Priority Data

Feb. 26, 2018  (JP) .............................. JP2018-031484

(51) Int. Cl.
*G01N 35/10*   (2006.01)
*G01N 35/00*   (2006.01)

(52) U.S. Cl.
CPC ..... *G01N 35/1004* (2013.01); *G01N 35/0092* (2013.01)

(58) Field of Classification Search
CPC ......... G01N 35/00871; G01N 35/0098; G01N 2035/00564; G01N 2035/00534
See application file for complete search history.

(56) References Cited

U.S. PATENT DOCUMENTS

2004/0185549 A1 * 9/2004 Fujita .................. G01N 35/025
                                                            435/287.2
2004/0265173 A1   12/2004 Matsumoto et al.
(Continued)

FOREIGN PATENT DOCUMENTS

EP    1 460 430 A1    9/2004
EP    2 233 931 A1    9/2010
(Continued)

OTHER PUBLICATIONS

International Search Report of PCT/JP2018/042231 dated Feb. 19, 2019.
(Continued)

*Primary Examiner* — Shogo Sasaki
(74) *Attorney, Agent, or Firm* — Mattingly & Malur, PC

(57) ABSTRACT

To provide an automated analyzer capable of shortening analysis time. The automated analyzer includes a vessel which contains a mixed solution of a specimen and a reagent; and a control unit which controls a first operation performed on the vessel, a second operation performed on the vessel after the first operation, and a third operation performed on a predetermined mechanism of the automated analyzer before the second operation, in which the control unit performs the first operation and the third operation in parallel. Alternatively, the automated analyzer includes a control unit which controls a first operation performed on the vessel, a second operation performed on the vessel after the first operation, and a third operation performed on a predetermined mechanism of the automated analyzer after
(Continued)

the first operation, in which the control unit performs the second operation and the third operation in parallel.

8 Claims, 4 Drawing Sheets

(56) References Cited

U.S. PATENT DOCUMENTS

| | | |
|---|---|---|
| 2007/0243600 A1 | 10/2007 | Lair et al. |
| 2010/0254857 A1* | 10/2010 | Mazume ............... G01N 35/04 134/113 |
| 2011/0293477 A1 | 12/2011 | Yamazawa et al. |
| 2012/0107180 A1 | 5/2012 | Yamakawa et al. |
| 2012/0251391 A1 | 10/2012 | Hagiwara et al. |
| 2014/0348704 A1 | 11/2014 | Kobayashi et al. |
| 2015/0293135 A1 | 10/2015 | Yamashita et al. |
| 2016/0195561 A1 | 7/2016 | Nogami et al. |

FOREIGN PATENT DOCUMENTS

| | | |
|---|---|---|
| JP | 05-164763 A | 6/1993 |
| JP | 06-64784 U | 9/1994 |
| JP | 2004-333259 A | 11/2004 |
| JP | 2010-151710 A | 7/2010 |
| JP | 2013-122402 A | 6/2013 |
| JP | 2017-020893 A | 1/2017 |
| WO | 2011/078118 A1 | 6/2011 |
| WO | 2014/088004 A1 | 6/2014 |
| WO | 2015/025610 A1 | 2/2015 |

OTHER PUBLICATIONS

Extended European Search Report received in corresponding European Application No. 18907270.5 dated Nov. 3, 2021.
Extended European Search Report received in corresponding European Application No. 18907270.5 dated May 11, 2022.

* cited by examiner

[Fig. 1]
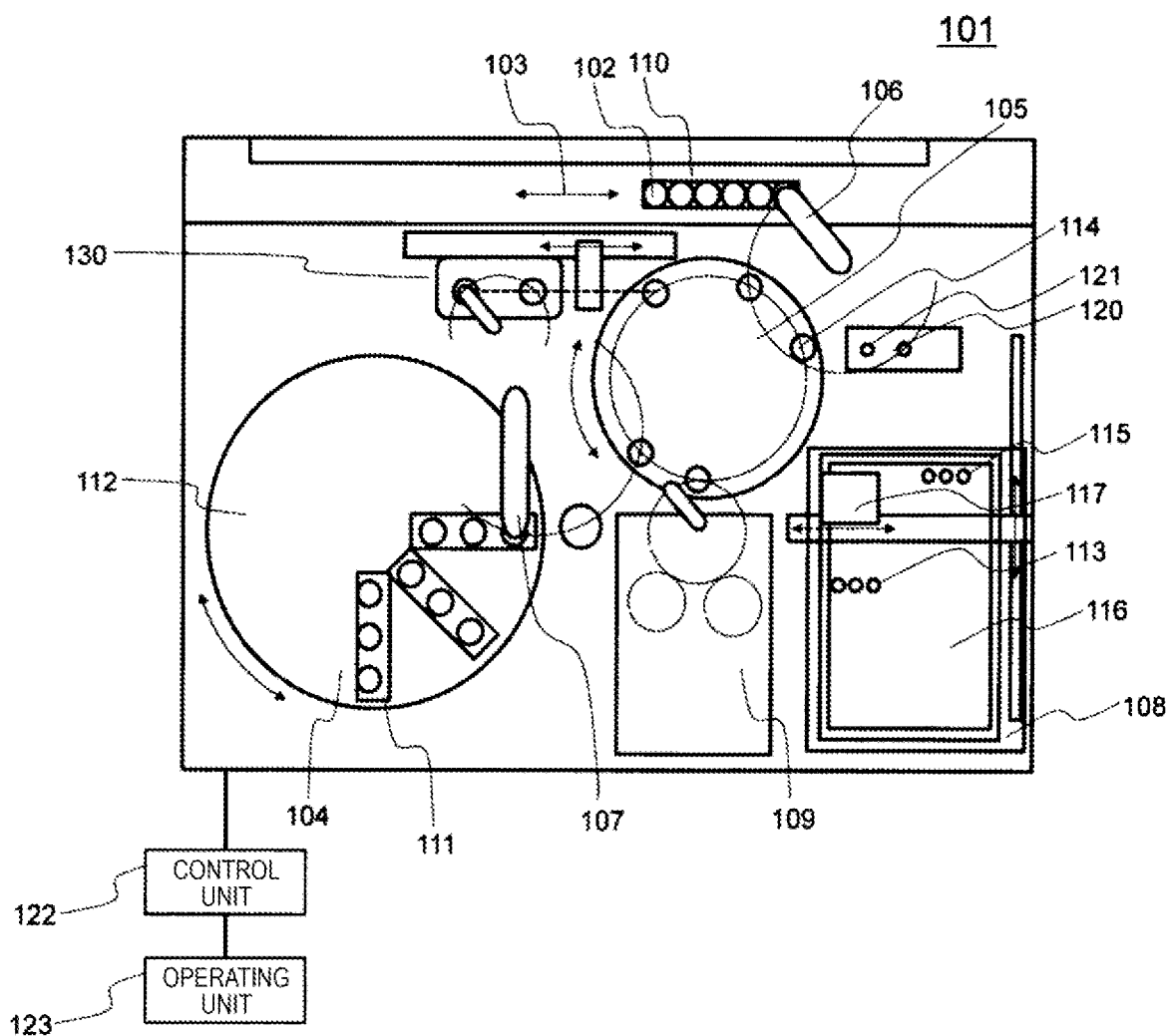

| No. | TARGET OPERATION | TARGET UNIT | PRE-OPERATION | POST OPERATION |
|---|---|---|---|---|
| 1 | T: INSTALLING TIPS & REACTION VESSELS | SECOND TRANSPORT UNIT | TP: • STATE CHECK FOR TIPS & REACTION VESSELS<br>• DISPOSAL OF REMAINING TIPS & REMAINING REACTION VESSELS | — |
| 2 | S: SPECIMEN DISPENSING | SPECIMEN DISPENSING UNIT | SP: WASHING DISPENSING CHANNEL AND REMOVING BUBBLES | SF: WASHING DISPENSING CHANNEL |
| 3 | R1, R2: REAGENT DISPENSING | REAGENT DISPENSING UNIT | RP: WASHING DISPENSING CHANNEL AND REMOVING BUBBLES | RF: WASHING DISPENSING CHANNEL |
| 4 | I: INCUBATION | INCUBATOR | IP: • STATE CHECK FOR REACTION VESSELS<br>• DISPOSAL OF REMAINING REACTION VESSELS | — |
| 5 | B: B/F SEPARATION | B/F SEPARATION UNIT | BP: • WASHING B/F SEPARATION LIQUID SUPPLY CHANNEL AND REMOVING BUBBLES<br>• PRIMING CHANNEL FOR B/F SEPARATION LIQUID | BF: WASHING B/F SEPARATION LIQUID SUPPLY CHANNEL |
| 6 | M: MEASUREMENT | MEASUREMENT UNIT | MP: • WASHING MEASUREMENT LIQUID SUPPLY CHANNEL AND REMOVING BUBBLES<br>• PRIMING CHANNEL FOR MEASUREMENT LIQUID<br>• WASHING CLEANING LIQUID SUPPLY CHANNEL AND REMOVING BUBBLES<br>• WASHING LIQUID CONTACT SECTION IN MEASUREMENT UNIT<br>• PRIMING CHANNEL FOR CLEANING LIQUID<br>• PRE-MEASUREMENT | MF: • WASHING MEASUREMENT LIQUID SUPPLY CHANNEL<br>• WASHING CLEANING LIQUID SUPPLY CHANNEL<br>• WASHING LIQUID CONTACT SECTION IN MEASUREMENT UNIT |
| 7 | D: REACTION VESSEL DISPOSAL | SECOND TRANSPORT UNIT | — | — |

B

| No. | COMMON ITEM | TARGET UNIT | PRE-OPERATION | POST OPERATION |
|---|---|---|---|---|
| 1 | H: RESET | ALL UNITS | HP: RETURNING TO HOME | — |
| 2 | Ts: HOLDING TIPS & REACTION VESSELS | MAGAZINE | TsP: CHECK FOR NUMBERS OF REMAINING TIPS & REMAINING REACTION VESSELS | — |
| 3 | Rs: HOLDING REAGENT | REAGENT HOLDING UNIT | RsP: CHECK FOR REAGENT HOLDING STATE | — |
| 4 | W: SUPPLYING WATER TO SYSTEM | SYSTEM WATER SUPPLY UNIT | WP: CHECK FOR SYSTEM WATER SUPPLY PUMP PRESSURE | — |

AUTOMATED ANALYZER

TECHNICAL FIELD

The present invention relates to an automated analyzer.

BACKGROUND ART

In an automated analyzer that analyzes specific components included in a specimen derived from a biological sample, such as blood and urine, it is necessary to perform pre-operations, such as reset of the driving mechanism or checking consumable items, on units having various functions relating to a certain analysis sequence. After the analysis sequence is ended, it is necessary to perform post-operations, such as washing.

Here, there is a technique in which analysis sequences are started being shifted by a certain time period and a plurality of analyses is sequentially performed in parallel (see Patent Literature 1).

Patent Literature 1: Japanese Unexamined Patent Application Publication No. Hei (1993) 5-164763

SUMMARY OF INVENTION

Technical Problem

According to Patent Literature 1, all pre-operations are performed before analysis sequences on all reaction vessels are started, and all post-operations are performed after the analysis sequences on all the reaction vessels are ended, leading to a problem that analysis time periods are increased.

Therefore, an object of the present invention is to provide an automated analyzer that shortens analysis time periods.

Solution to Problem

An automated analyzer according to an aspect of the present invention includes a vessel which contains a mixed solution of a specimen and a reagent, and a control unit which controls a first operation performed on the vessel, a second operation performed on the vessel after the first operation, and a third operation performed on a predetermined mechanism of the automated analyzer before the second operation. The control unit performs the first operation and the third operation in parallel.

Advantageous Effects of Invention

According to the present invention, an automated analyzer that shortens analysis time periods can be provided.

BRIEF DESCRIPTION OF DRAWINGS

FIG. 1 is a schematic diagram of an automated analyzer.

FIG. 2 is a diagram in which items associated to the analysis, target units of the items, pre-operations of the items and post-operations of the items are summarized.

FIG. 3 is a diagram showing a plurality of analysis sequences.

FIG. 4 is a diagram showing a plurality of analysis sequences different from those shown in FIG. 3.

DESCRIPTION OF EMBODIMENTS

FIG. 1 is a schematic diagram of an automated analyzer 101. The automated analyzer 101 includes a first transport unit 103 which linearly transports a specimen rack 110 that accommodates a plurality of specimen vessels 102, a reagent holding unit 104 which holds a reagent 111 in a cold state and is rotatable, an incubator 105 which has a plurality of reaction vessel holding positions 114 that holds a reaction vessel 113 in a heating state to promote (incubate) reactions and is rotatable, a specimen dispensing unit 106 which includes a specimen probe that dispenses a specimen from the specimen vessel 102 to the reaction vessel 113 on the incubator 105, a reagent dispensing unit 107 which includes a reagent probe that dispenses the reagent 111 from the reagent holding unit 104 to the reaction vessel 113 on the incubator 10, a magazine 108 which holds an accommodation unit 116 that accommodates a tip used for dispensing the specimen (in the following, a chip) 115 and the reaction vessel 113, a second transport unit 117 which transports the chip 115 and the reaction vessel 113 among the magazine 108, the specimen dispensing unit 106, the tip supply position 120, a disposal hole 121 that disposes of the chip 115 and the reaction vessel 113, and the incubator 105, a B/F separation unit 130 which washes and removes a measurement interference component contained in the specimen with a B/F separation liquid, a measurement unit 109 which measures signals, such as light signals and electrical signals, in correlation with the amount of an analysis target component, a control unit 122, and an operating unit 123.

The automated analyzer 101 includes, not shown, a measurement liquid supply unit which supplies a measurement liquid necessary for measurement to the measurement unit 109, a cleaning liquid supply unit which supplies a cleaning liquid for washing the liquid contact section of the measurement unit 109, and a system water supply unit which supplies a system water with which a channel is filled to transfer the measurement liquid or a cleaning liquid. In the specimen dispensing unit 106, the reagent dispensing unit 107, the B/F separation unit 130, and the measurement unit 109, s liquids are transferred by driving a syringe provided on each unit. The system water is transferred by generating a certain pressure using a system water supply pump.

FIG. 2 is a diagram in which items associated to the analysis, target units of the items, pre-operations of the items and post-operations of the items are summarized. FIG. 2A relates to target operations in analysis sequences, and FIG. 2B relates to common items in the automated analyzer. Here, in the present embodiment, the term "analysis sequence" expresses a series of processes that is performed on one reaction vessel 113 (one analysis item) installed on the incubator 105. The term "operation" expresses individual processes including specimen dispensing and reagent dispensing, for example, in the analysis sequence. Note that, English characters are imparted to the operations for simplifying the description.

1) Installing chips/reaction vessels (T): the second transport unit 117 installs the chip 115 at the tip supply position 120, and installs the reaction vessel 113 on the incubator 105 from the magazine 108.

2) Specimen dispensing (S): the specimen dispensing unit 106 dispenses a specimen from the specimen vessel 102 to the reaction vessel 113 on the incubator 105, and the second transport unit 117 disposes of a used chip 115 in the disposal hole 121.

3) First reagent dispensing (R1): the reagent dispensing unit 107 dispenses s first reagent 111 from the reagent holding unit 104 to the reaction vessel 113 on the incubator 105.

4) First incubation (I1): the reaction vessel 113 is held on the incubator 105 at a certain temperature for a certain time period.

5) Second reagent dispensing (R2): the reagent dispensing unit 107 dispenses a second reagent 111 from the reagent holding unit 104 to the reaction vessel 113 on the incubator 105.
6) Second incubation (I2): the reaction vessel 113 is held on the incubator 105 at a certain temperature for a certain time period.
7) B/F separation (B): the B/F separation unit 130 washes and removes a measurement interference component contained in the specimen from the reaction vessel 113 using the B/F separation liquid.
8) Measurement (M): the measurement unit 109 measures signals, such as light signals and electrical signals, in correlation with the amount of an analysis target component contained in the reaction vessel 113.
9) Reaction vessel disposal (D): the second transport unit 117 disposes of the used reaction vessel 115 in the disposal hole 121.

The following is common items in the automated analyzer that do not directly relate to analysis sequences.
1) Reset (H): driving mechanisms are reset (returning-to-home operation and any other operation).
2) Holding chips and reaction vessels (Ts): the accommodation unit 116 containing the chip 115 and the reaction vessel 113 is held on the magazine 108.
3) Holding reagent (Rs): the reagent 111 is held on the reagent holding unit 104 in the cold state.
4) Supplying water to the system (W): the system water supply pump is caused to generate a pressure that supplies the system water.

Next, the pre-operations and the post-operations of the analysis sequences will be described. In the following, in regard to the pre-operation and the post-operation, an English character for the target operation or the common item is connected to P that expresses the pre-operation or F that expresses the post-operation. For example, the pre-operation (P) for specimen dispensing (S) is written in "SP", and the post-operation (F) for specimen dispensing (S) is written "SF". Note that, there are two types of reagent dispensing, R1 and R2. However, R1 and R2 are the same as the pre-operation and the post-operation, and the pre-operation is written in "RP", and the post-operation is written in "RF" (the same thing is applied to incubation).
1) TP: TP expresses the state check for the chips 115 and the reaction vessels 113 and/or the disposal of the remaining chips 115 and the remaining reaction vessels 113 on the automated analyzer in the midway point of analysis in the case in which analysis in the past is terminated due to an abnormality, for example. Note that, TF is unnecessary.
2) SP, SF: SP expresses washing the dispensing channel and removing bubbles (air purge). The term "washing the dispensing channel" means washing the inside of the channel and the outer surface of the probe for the purpose of suppressing the influence of attachments, for example, derived from environments, such as in the case in which a certain time period or more elapses from the previous analysis. The term "removing bubbles" means removing bubbles by a method and the like of replacing a liquid in the inside of the channel relating to the syringe for the purpose of suppressing the fluctuation in dispensing accuracy the case in which bubbles are present in the inside of the channel. Subsequently, SF means washing the dispensing channel. Although this is similar to washing in RP, the purpose is to suppress the adhesion of substances attached to the inside of the channel or to the outer surface of the probe due to analysis.
3) RP, RF: RP and RF are similar to SP and SF, respectively.

4) IP: Although Ip is similar to TP, only the reaction vessel 113 corresponds. Note that, IF is unnecessary.
5) BP, BF: BP expresses washing the B/F separation liquid supply channel, removing bubbles, and priming the channel for the B/F separation liquid. In regard to washing and removing bubbles, these are similar to RP. The term "priming a channel for" means that the B/F separation liquid in the inside of the B/F separation supply channel is replaced and refreshed for the purpose of suppressing the influence of aging of the B/F separation liquid in the inside of the channel in the case in which a certain time period or more elapses from the previous analysis, for example. Subsequently, BF expresses washing the B/F separation liquid supply channel.
6) MP, MF: In regard to the measurement liquid and the cleaning liquid, MP and MF are similar to BP and BF, respectively. As MP, before analysis is performed, pre-measurement is performed. The term "pre-measurement" means measurement that is performed using a pre-measurement specimen, for example, for the purpose of suppressing the influence of attachments, for example, derived from environments in the case in which a certain time period or more elapses from the previous analysis, for example. From this result, it can be confirmed that the measurement unit 109 appropriately functions. Subsequently, MF expresses washing the liquid contact section of the measurement unit 109 for the purpose of suppressing the adhesion of attached substances.
7) DP and DF are both unnecessary.

Next, pre-operations for the common items in the automated analyzer will be described. Note that, in the case of the common items, post-operations are unnecessary.
1) HP: The driving mechanisms are returned (reset) to the home positions for checking and initialization of the operations the driving mechanisms.
2) Ts: Check for the remaining numbers of the chips 115 and the reaction vessels 113 before analysis is performed. In the case in which the chips 115 and the reaction vessels 113 necessary for analysis are short, measures are taken, such as the halt of analysis, for example, as necessary.
3) Rs: Check for the remaining number of reagents before analysis is performed.
4) W: Check for the pressure in the pump that supplies the system water before analysis is performed. In the case in which the pressure is inappropriate, measures are taken, such as the halt of analysis, for example, as necessary.

Here, in the conventional automated analyzer, in order to avoid a halt in the midway point of analysis due to the occurrence of a trouble after analysis is started, the first analysis sequence is started after various pre-operations are ended. In order to avoid a halt in the midway point of analysis due to the occurrence of a trouble in post-operations, post-operations are started after the last analysis sequence is ended. However, in association with higher sophistication of the automated analyzer, time required for pre-operations and post-operations is increased, and waiting time until an analysis result is obtained is prone to increase.

On the other hand, in association with the high reliability of the automated analyzer, the possibility of the halt of analysis in the midway point is prone to decrease. More specifically, with the development of techniques of suppressing the influence in occurrence of troubles, a series of analyses in progress can be continued even though troubles occur, and thus the case in which the troubles affect influence is extremely limited. Therefore, in the following, the flow of the automated analyzer that shortens analysis time periods will be described.

Figure 3:
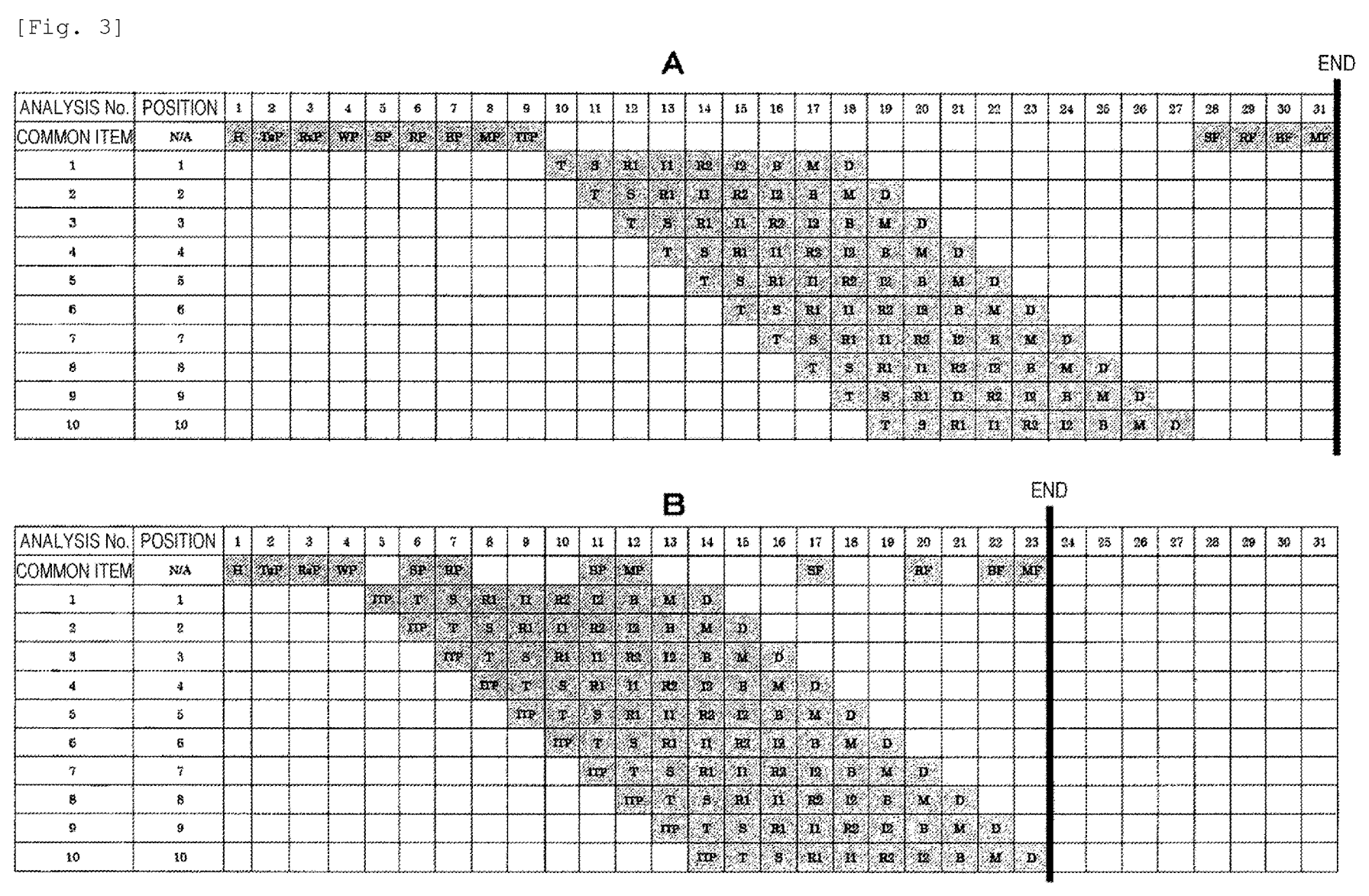

FIG. 3 is a diagram showing a plurality of analysis sequences. FIG. 3(A) shows conventional examples, and FIG. 3(B) shows the embodiment. These drawings show positions on the incubator 105 at which the reaction vessel 113 is installed in the analysis sequences as the identification number of the analysis sequence. Here, analysis sequences in ten times in total are performed using positions 1 to 10 on the incubator 105. Other than the analysis sequences performed on the reaction vessels 113, operations performed on a predetermined mechanism of the automated analyzer are swoon in the row "common" (these operations are not performed as a part of the analysis sequence). The numerical characters on the horizontal axis show the step number of the operation after the analysis sequence is started. That is, time elapses more after the analysis sequence is started, as the numerical character is larger. In the following, steps in the operations are written as S1, S2, . . . . A line denoted by "end" is imported at timing at which all the analysis sequences are ended.

In FIG. 3(A), first, H (S1), TsP (S2), RsP (S3), WP (S4), SP (S5), RP (S6), BP (S7), MP (S8), ITP (S9) are in turn performed. Note that, IP and TP are expressed in one step, and IP and TP are collectively written in ITP for simplifying the notation.

After all the pre-operations are ended, the first operation T in the first analysis sequence is started (S11). Subsequently, the first analysis sequence is transitioned to the subsequent operation S, and the first operation T in the subsequent analysis sequence is started (S12). In this manner, a plurality of analysis sequences are sequentially performed in parallel. The first analysis sequence is ended in D (S18). After that, the analysis sequence is sequentially ended, and all the analysis sequences are ended in S27. After that, SF (S28), RF (S29), BF (S30), and MF (S31) are sequentially performed. Finally, all the operations are ended in S31.

Next, the embodiment in FIG. 3(B) will be described. Here, in the pre-operations in S1 to S9 shown in FIG. 3(A), H, TsP, RsP, and WP are selected. These operations are sequentially performed as H (S1), TsP (S2), RsP (S3), and WP (S4). The selection of a part of the pre-operation only has to be performed in comprehensive consideration of time (the step numbers) required for all the operations and the possibility of interruption of the operation due to troubles. Note that, it may be thought that a part of the pre-operation is the pre-operation necessary to the first operation T in the first analysis sequence.

After S4, a part of the pre-operation (ITP) that is desirably performed prior to the first operation T in the first analysis sequence is performed (S5). That is, the operation described in the row "common" in the comparative example is performed as a part of the analysis sequence.

After ITP is ended, the first analysis sequence is started, and steps are sequentially performed as T (S6), S (S7), R1 (S8) . . . . Here, since SP has to be ended before the first analysis sequence is transitioned to S, SP is performed in S6 in the present embodiment. Note that, SP may be performed at any timing as long as prior to S6. similarly, RP is performed in S7 prior to R1 (S8), BP is performed in S11 prior to B (S12), and MP is performed in S12 prior to M (S13).

After that, in S16, S in the last (the tenth time) analysis sequence is ended. In S17, SF is performed. That is, the post-operation relating to the ended operation is performed without waiting for ending the last operation D in the last analysis sequence. similarly, RF is performed in S20 after R2 (S19), BF is performed in S22 after B (S21), and MF is performed in S23 after M (S22).

As described above, before the first analysis sequence is started, the positions used in the analysis sequences only have to be checked before the analysis sequences are started, and thus the first analysis sequence can be started without waiting for the time for checking all the positions. A part of the pre-operation conventionally performed is performed in parallel with the analysis sequence, and/or a part of the post-operation conventionally performed is performed in parallel with the analysis sequence, and thus time required to end the entire analysis processes can be noticeably shortened. In the present example, the step numbers necessary for the entire operations are reduced by eight steps in total from 31 steps in the comparative example to 23 steps.

Figure 4:
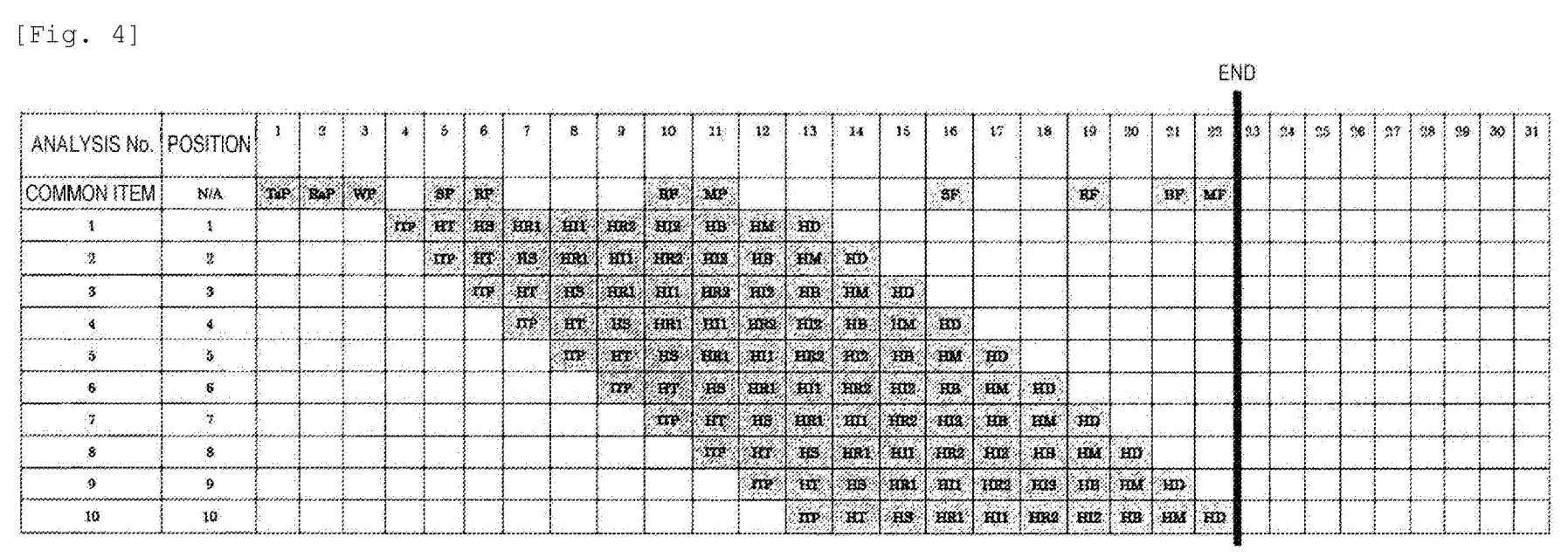

FIG. 4 is a diagram showing a plurality of analysis sequences different from those shown in FIG. 3. Here, an example is shown in which H in the units is performed immediately before the operation of a target unit, i.e., H and the operation are collectively performed in one step. In FIG. 3, H is performed prior to the first analysis sequence, whereas in the present example, H is divisionally performed when the units are used. Thus, Step S1 in FIG. 3 can be removed. In combined application with the example in FIG. 3(B), nine steps in total are reduced from 31 steps in the comparative example to 22 steps.

In the present embodiment, the description is made in which the position used on the incubator is one for one analysis item. However, in measurement, for example, in which a specimen that is assumed to exceed the measurable concentration range is automatically diluted on the automated analyzer, a plurality of reaction vessels installed at a plurality of positions may be used for one analysis item.

For example, T, S, R1, and I1 are performed on reaction vessel A installed at position 1 on the incubator, and a part of a mixed solution in reaction vessel A diluted by these operations is dispensed to reaction vessel B installed at position 5. Subsequently, R2, I2, B, M, and D are performed on reaction vessel B. In this case, reaction vessel A remains on the incubator. That is, in the case in which a plurality of reaction vessels is used for one analysis item, it is necessary to check whether the reaction vessels remain on the incubator when analysis is ended (in the following, referred to as remaining vessels). (Of course, even in the case in which only one reaction vessel is used for one analysis item the remaining vessels may be checked). As described above, in the case in which check for the remaining vessels (when the remaining vessels are present) and the disposal process for the remaining vessels are performed, the application of the comparative example in FIG. 3(A) that is unchanged performs the process in S32. However, the process is performed in S24 in FIG. 3(B), and in S23 in FIG. 4.

In the present embodiment, the description is made in which all the operations are ended in one step. However, a part of the operation may be performed across a plurality of steps. For example, it takes time for sufficient incubation, and the operation often performed across a plurality of steps.

In the present embodiment, the order of processes is shown in FIG. 3 and in FIG. 4. However, the order is not essential. Note that, H is preferably performed first, and state check for TsP and RsP is preferably performed prior to TP and RP, respectively. The other orders can be selected suitable for the properties and states of the automated analyzer.

In the present embodiment, an example of the automated analyzer is shown in which a liquid is transferred from the reaction vessel to the measurement unit and disposable reaction vessels are used. However, it is without saying that the embodiment is applicable to automated analyzers that directly measures a liquid in a reaction vessel and to automated analyzers that repeatedly use reaction vessels by washing, for example.

As described above, according to the present embodiment, time required for pre-operations and post-operations in analysis sequences can be shortened. Accordingly, the operation efficiency of the automated analyzer can be improved overall.

REFERENCE SIGNS LIST

101: automated analyzer
102: specimen vessel
103: first transport unit
104: reagent holding unit 105: incubator
106: specimen dispensing unit
107: reagent dispensing unit 108: magazine
110: specimen rack
111: reagent
113: reaction vessel
114: reaction vessel holding position
115: tip
116: accommodation unit
117: second transport unit
120: tip supply position 121: disposal hole
122: control unit
123: operating unit
130: B/F separation unit

The invention claimed is:

1. An automated analyzer, comprising:
an incubator having a plurality of vessels which contains a mixed solution of a specimen and a reagent; and
a control unit configured to control continuous performance of an analysis sequence comprising a series of process steps performed on a vessel in the plurality of the vessels, by sequentially shifting starting timing of the analysis sequence for each of the plurality of the vessels,
wherein: the series of process steps includes a first process step requiring a pre-operation and a second process step requiring a post-operation; and
in a course of continuously performing the analysis sequence for each of the plurality of the vessels, the control unit performs at least any one of performing, in parallel, the pre-operation and the analysis sequence performed at a timing before a timing at which the first process step or the second process step is performed in a first analysis sequence, and performing, in parallel, the post-operation and the analysis sequence performed at a timing after a timing at which the second process step is performed in a last analysis sequence.

2. The automated analyzer according to claim 1, wherein the pre-operation is at least either of state check for a plurality of vessels installed on the incubator, and disposal of the vessel which remains on the incubator.

3. The automated analyzer according to claim 1, wherein the pre-operation is at least any one of washing a B/F separation liquid supply channel, removing bubbles in the B/F separation liquid supply channel, and priming a channel for a B/F separation liquid.

4. The automated analyzer according to claim 1, wherein the pre-operation is at least any one of washing a measurement liquid supply channel, removing bubbles in the measurement liquid supply channel, priming a channel for a measurement liquid, washing a cleaning liquid supply channel, removing bubbles in the cleaning liquid supply channel, and priming a channel for the cleaning liquid.

5. The automated analyzer according to claim 1, wherein the post-operation is washing a B/F separation liquid supply channel.

6. The automated analyzer according to claim 1, wherein the post-operation is at least any one of washing a measurement liquid supply channel, and washing a cleaning liquid supply channel.

7. The automated analyzer according to claim 1, wherein the control unit performs reset that returns a driving mechanism in the automated analyzer to a home position before the first analysis sequence.

8. The automated analyzer according to claim 1, wherein the series of process steps of the analysis sequence include reset operation that returns a driving mechanism in the automated analyzer to a home position.

* * * * *